United States Patent
Kiuchi et al.

(10) Patent No.: US 6,847,723 B1
(45) Date of Patent: Jan. 25, 2005

(54) VOICE INPUT APPARATUS

(75) Inventors: Shingo Kiuchi, Iwaki (JP); Kouichi Nakata, Iwaki (JP); Nozomu Saito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/438,447

(22) Filed: Nov. 12, 1999

(30) Foreign Application Priority Data

Nov. 12, 1998 (JP) .......................................... 10-338454

(51) Int. Cl.[7] .............................................. H04B 15/00
(52) U.S. Cl. ............... 381/94.7; 381/71.11; 379/406.09
(58) Field of Search .............................. 381/71.1, 71.8, 381/71.11, 71.6, 71.3, 71.4, 94.7, 91, 92, 122; 379/406.09, 406.08

(56) References Cited

U.S. PATENT DOCUMENTS

| | | | |
|---|---|---|---|
| 5,251,263 A | * | 10/1993 | Andrea et al. ............. 381/71.6 |
| 5,402,496 A | | 3/1995 | Soli et al. |
| 5,581,619 A | * | 12/1996 | Shibata et al. ............. 381/71.4 |
| 5,740,256 A | * | 4/1998 | Castello Da Costa et al. ... 381/94.7 |
| 5,796,819 A | * | 8/1998 | Romesburg ............ 379/406.09 |

* cited by examiner

Primary Examiner—Xu Mei
Assistant Examiner—Con P. Tran
(74) Attorney, Agent, or Firm—Brinks Hofer Gilson & Lione

(57) ABSTRACT

The present invention provides a voice input apparatus which can extract an input voice without interrupting a generated background sound.

When a talk switch 50 is pushed down, a LMS algorithm processing part 26 stops an update operation of a filter coefficient of an adaptive filter 24 and stores filter coefficient W1 at this moment in a portion for storing filter coefficients 30. A portion for calculating filter coefficients 44 calculates a filter coefficient W2 of a filter 42 to simulate a sound-transmittal line of an audio sound which is produced from a speaker 102 and is input into microphones 10, 12 by means of these stored filter coefficient W1 and various transmittal characteristics CS1, CS2 and the like. By extracting an output signal Y4 of the filter 42 from an output signal Y3 of a portion for eliminating surrounding noise 20 by means of a computing part 46, audio sound components included with an operating voice collected by the microphones 10, 12 are removed.

10 Claims, 2 Drawing Sheets

VOICE INPUT APPARATUS

BACKGROUND OF THE INVENTION

1. Field of the Invention

The present invention relates to a voice input apparatus, and particularly to apparatus for removing noise from among the sounds collected by a microphone.

2. Related Art

As a method for providing various operating instructions to a vehicle-mounted apparatus, for example, a navigation system or an audio device, in addition to a manual method in which a user pushes down various keys installed on an operating panel or a remote control unit (remote controller), there is a method performed by recognizing the contents of a user's voice. When an operating instruction is provided by means of a voice recognition apparatus, it is not necessary to remember the placement or the like of operating keys. Furthermore, it is possible to simplify the operation because a key operation is saved while the vehicle is moving during driving. Especially in recent years, its use is often found in a vehicle-mounted apparatus along with high-speed processing capability.

Typical factors lowering the recognition rate of such a voice recognition apparatus are road noise, car noise inside the vehicle caused by an engine or the like while driving, and audio sound produced from an audio apparatus inside the vehicle. When these noises and the audio sound are superimposed on the voice of a user, it becomes difficult to correctly perform voice recognition because the voice recognition apparatus cannot discriminate and process only the voice of the user from among the various sounds. Conventionally, contrivances have been made to reduce the various noises and the audio sound superimposed on a voice signal targeted for voice recognition such that road noise is reduced by means of the art of adaptive microphones array, or an audio sound output is interrupted or its volume is lowered when a talk switch is pushed down.

However, when measures are taken to interrupt an audio output or lower the volume level of the audio by depressing a talk switch, there is a problem of hindering a user's listening because the audio sound is interrupted when the voice recognition processing is performed frequently. In particular, a passenger other than a user who is operating the vehicle-mounted apparatus by voice input may be listening to an audio sound and feel disturbed when the audio sound is frequently interrupted. Therefore, a method is desired which can extract an input voice without interrupting generated audio sounds.

The present invention is made to address these points and its object is to provide a voice input system which can extract an input voice without interrupting generated sounds.

BRIEF SUMMARY OF THE INVENTION

In order to solve the above-mentioned problems, the voice input apparatus of the present invention comprises a means for eliminating surrounding noise which removes the surrounding noise components included with a voice signal produced from a sound collecting means. This is accomplished by means of an adaptive filter and an eliminating means which can extract just the voice of a user from the voice signal by removing surrounding noise components and speaker sound components (for example, an audio sound produced from the speaker), so that it is not necessary to lower the speaker's volume or the like.

More specifically, the above-mentioned sound collecting means comprises first and second microphones, and the means for eliminating surrounding noise includes an adaptive filter which simulates a noise signal produced from the first microphone by a noise signal produced from the second microphone, and a first computing means calculates a difference between these two noise signals. Because the noise signals produced from two microphones can be in good agreement with each other by means of the adaptive filter, surrounding noise components can be cancelled by calculating the difference between these two signals, whereby it is possible to obtain a voice signal from which these surrounding noise components are removed.

Furthermore, the above-mentioned means for eliminating speaker sound comprises a filter simulating a transmittal line characteristic via a speaker and the means for eliminating surrounding noise and a second computing means calculating a difference between a signal via the means for eliminating surrounding noise and a signal via the filter. Because it is possible to generate a signal equivalent to a signal corresponding to a sound actually produced from the speaker by the filter, as the transmittal line characteristic of an audio sound or the like produced from the speaker is simulated by the filter, output sound components can be cancelled and a voice signal can be obtained with these output sound components removed.

Furthermore, when the time for a voice input for the sound collecting means is indicated, it is preferable that an update operation of the filter coefficient of the adaptive filter is stopped, and the filter coefficient of the filter based on the filter coefficient of the adaptive filter when this update operation is stopped is computed. Because a characteristic of the sound transmittal line via the means for eliminating surrounding noise is fixed when the filter coefficient of the adaptive filter is fixed, it is possible to obtain the filter, coefficient of the filter simulating this characteristic by calculation.

DETAILED DESCRIPTION OF THE INVENTION

Figure 1:
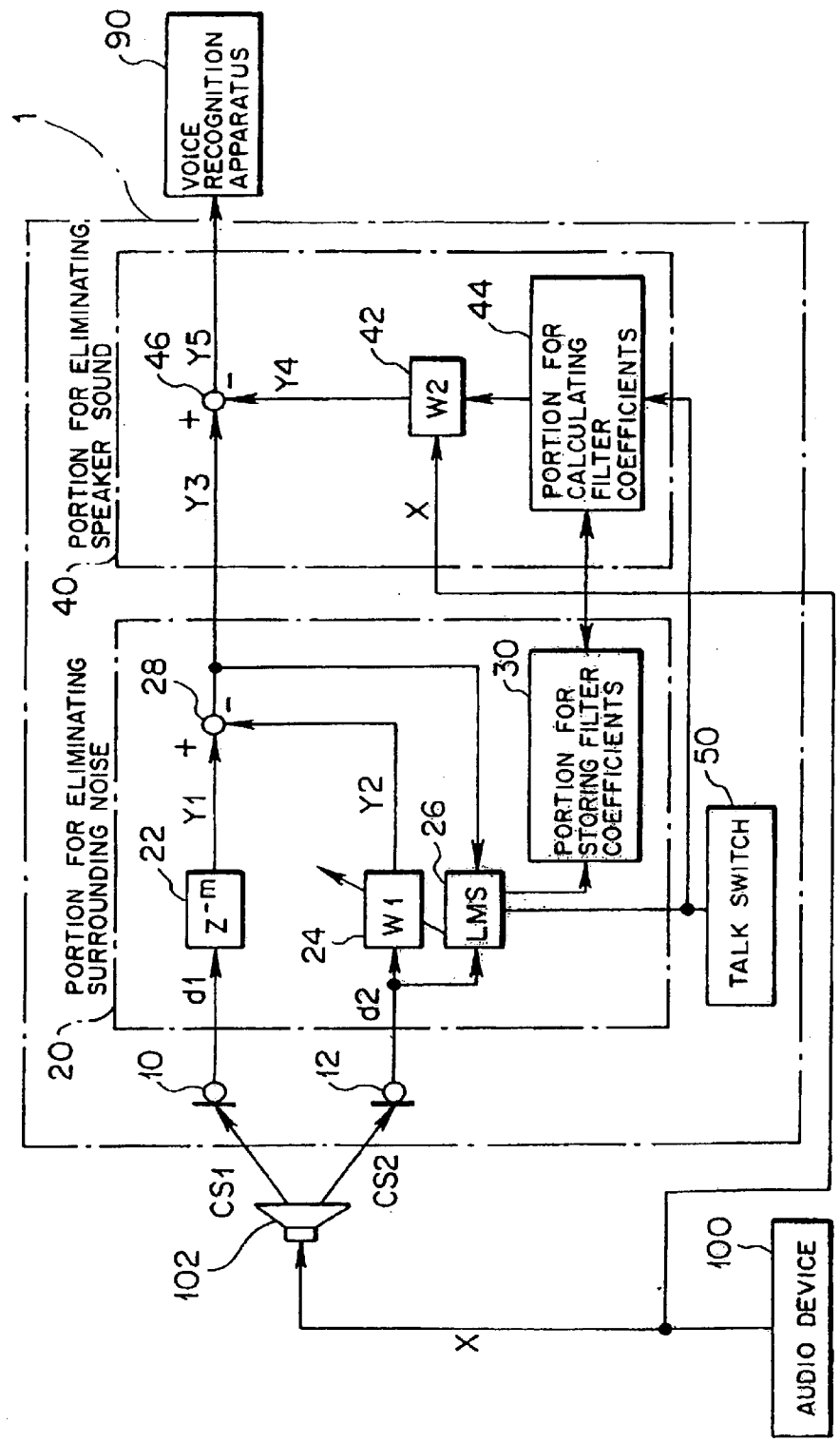
FIG. 1 is a drawing showing the construction of the voice input apparatus of the present embodiment.

A voice input apparatus of one embodiment according to the present invention is explained by referring to the drawings. FIG. 1 is a drawing showing a configuration of the voice input apparatus according to the present embodiment. The voice input apparatus 1 of this embodiment includes two microphones 10, 12, a portion for eliminating surrounding noise 20, a portion for eliminating speaker sound 40 and a talk switch 50. When a user voices instructions for a vehicle-mounted navigation system or the like (not shown) toward the microphones 10, 12, it enters into the voice recognition apparatus 90 with the various noise components which are included in a voice signal produced from the microphones 10, 12 removed. Regarding the various noise components collected by the microphones 10, 12, surrounding noise consisting of the sound of an operating engine, driving noise or the like caused by driving on a road, and audio sound generated inside the vehicle from a speaker 102 connected to an audio device 100 are to be taken into consideration.

The microphones 10, 12 are set at a certain place inside a vehicle to receive instructions voiced by a user. For example, if the driver mainly voices the operating instructions, the microphones can be set at a sunvisor in front of the driver at a certain distance (for example, 15 cm).

The portion for eliminating surrounding noise 20 is for removing surrounding noise included in a voice signal produced from the microphones 10, 12 and includes a delay device 22, an adaptive filter 24, a LM algorithm processing part 26, a computing part 28 and a portion for storing filter coefficients 30.

The delay device 22 produces a signal Y1 which is delayed by a certain time relative to a voice signal d1 produced from one microphone 10. For example, it is a FIR (Finite Impulse Response)-type digital filter having a transmittal characteristic $Z^{-m}$ which is realized by setting tap coefficients corresponding to a delay time t at 1 and tap coefficients other than that at 0.

Also, the adaptive filter 24 is a FIR-type digital filter having a filter coefficient (tap coefficient) W1 and performs a certain adaptive equalization processing for a voice signal d2 produced from the other microphone 12. This filter coefficient W1 is updated by the LMS (Least Mean Square) algorithm processing part 26.

Inputs to the LMS algorithm processing part 26 are a voice signal produced from the microphone 12 and a difference signal Y3 (discussed below) produced from the computing part 28. The LMS algorithm processing part 26 updates the filter coefficient W1 of the above-mentioned adaptive filter 24 in such a manner that the power of the difference signal Y3 produced from the computing part 28 is minimized by using the LMS algorithm.

The computing part 28 generally calculates a difference between the voice signal d1 produced from one microphone 10 and the voice signal d2 produced from the other microphone 12 and produces an output of the difference as signal Y3. The filter coefficient W1 of the adaptive filter 24 is set so that the power of this difference signal Y3 is minimized by the above-mentioned LMS algorithm processing part 26. Therefore, the amplitude and phase of an output signal Y2 of the adaptive filter 24 are controlled so as to cancel the signal Y1 after a delay produced from the delay device 22. The difference signal Y3 produced from the computing part 28 is an output signal of the portion for eliminating surrounding noise 20 and is an input to the portion for eliminating speaker sound 40.

The portion for storing filter coefficients 30 stores the filter coefficient W1 of the adaptive filter 24 at a certain time. Specifically, when a talk switch 50 is pushed down by a user, an update operation of the filter coefficient W1 of the adaptive filter 24 by the LMS algorithm processing part 26 is interrupted for a certain time, wherein the filter coefficient W1 is stored in the portion for storing filter coefficients 30. Also, in the portion for storing filter coefficients 30, a transmittal characteristic CS1 from the speaker 102 to one microphone 10 and a transmittal characteristic CS2 to the other microphone 12 are stored. These transmittal characteristics CS1, CS2 are previously measured. For example, the transmittal characteristics CS1, CS2 are measured by an operation of a user when a vehicle is bought, and the transmittal characteristics suited for a vehicle equipped with a voice input apparatus of the present embodiment is selected from among transmittal characteristics CS1, CS2 previously prepared for the vehicle type and is stored in the portion for storing filter coefficients 30.

The portion for eliminating speaker sound 40 shown in FIG. 1 is intended to remove an audio sound included in the output signal Y3 of the portion for eliminating surrounding noise 20, and includes a filter 42, a portion for calculating filter coefficients 44 and a computing part 46.

The filter 42 is a FIR-type digital filter having a filter coefficient W2 and performs a certain processing for an audio signal X produced from the audio device 100. The calculating portion for filter coefficients 44 obtains the coefficient W2 for filter 42 by calculation based on various data (the filter coefficient W1 of the adaptive filter 24, the transmittal characteristics CS1, CS2 from the speaker 102 to each microphone 10, 12) stored in the portion for storing filter coefficients 30 in the portion for eliminating surrounding noise 20. This filter coefficient W2 shows a transmittal characteristic until audio sound produced from the speaker 102 reaches the computing part 46 in the portion for eliminating speaker sound 40 through the portion for eliminating surrounding noise 20 and a specific calculating method is discussed below.

The computing part 46 calculates the difference between the output signal Y3 of the portion for eliminating surrounding noise 20 and an output signal Y4 of the filter 42 and produces a difference signal Y5. The difference signal Y5 from the computing part 46 is the output signal of the voice input apparatus 1 and is provided as the input into the voice recognition apparatus 90.

The talk switch 50 shown in FIG. 1 is operated before a user voices an operating instruction, and the operational conditions are sent to the LMS algorithm processing part 26 in the portion for eliminating surrounding noise 20 and to the portion for calculating filter coefficients 44 in the portion for eliminating speaker sound 40, respectively. When the talk switch 50 is pushed down, the LMS algorithm processing part 26 temporarily stops an update processing of the filter coefficient W1 of the adaptive filter 24 and stores the filter coefficient W1 at this moment in the portion for storing filter coefficients 30. Also, after the talk switch 50 is pushed down, the portion for calculating filter coefficients 44 reads the filter coefficient W1 stored in the storing portion for filter coefficients 30 and the previously stored transmittal characteristics CS1, CS2 and calculates the filter coefficient W2 of the filter 42.

The above-mentioned microphones 10, 12 correspond to the sound collecting means; the portion for eliminating surrounding noise 20 to the means for eliminating surrounding noise; the LMS algorithm processing part 26 to the filter processing means; the computing part 28 to the first computing means; the portion for eliminating speaker sound 40 to the means for eliminating speaker sound; the portion for calculating filter coefficients 44 to the means for calculating filter coefficients; and the computing part 46 to the second computing means, respectively.

Figure 2:
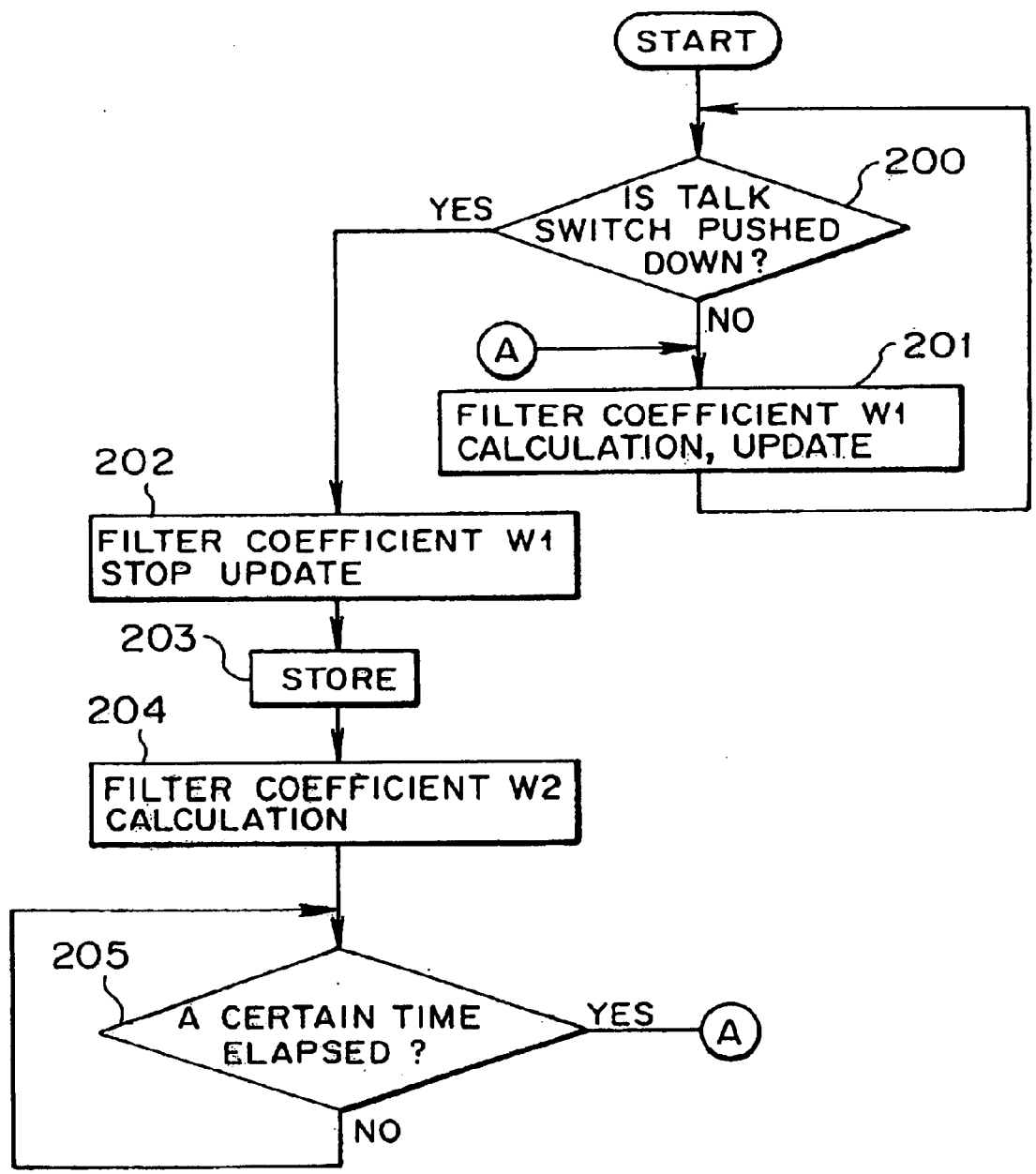
FIG. 2 is a flow chart showing the operation of the voice input apparatus of the present embodiment.

The operation of voice input apparatus 1 of this embodiment will now be explained. FIG. 2 is a flow chart showing the procedure to update each filter coefficient included in the voice input apparatus 1 of this embodiment.

The LMS algorithm processing part 26 is also provided with the additional function of determining whether or not the talk switch 50 is pushed down by a user, irrespective of the driving condition of a vehicle (step 200). When the talk switch 50 is not pushed down, it calculates and updates the filter coefficient W1 of the adaptive filter 24 so that the power of the difference signal Y3 produced from the computing part 28 is minimized (step 201). Because the filter coefficient W1 of the adaptive filter 24 is set in this way, it is possible to make both transmittal characteristics corresponding to one sound-transmittal line of surrounding noise (from an engine or the tires or the like) to the computing part 28 via one microphone 10 and the delay device 22 and the other sound-transmittal line of surrounding noise to the computing part 28 via the other microphone 12 and the adaptive filter 24 identical. Therefore, as the surrounding noise which reaches the computing part 28 though these two sound-transmittal lines becomes identical in phase and amplitude, this surrounding noise can be removed by obtaining a difference between the input signals Y1 and Y2 by means of the computing part 28.

In parallel with this operation of eliminating surrounding noise, a decision operation is performed in the above-mentioned step 200 (whether the talk switch is pushed down). When the talk switch 50 is pushed down by a user, the LMS algorithm processing part 26 stops the update processing of the filter coefficient W1 of the adaptive filter 24 (step 202) and stores the filter coefficient W1 which is set in the adaptive filter 24 at this point of time in the portion for storing filter coefficients 30 (step 203). Furthermore, as mentioned above, the transmittal characteristics CS1, CS2 previously obtained from the speaker 102 to each microphone 10, 12 and the transmittal characteristic $Z^{-m}$ of the delay device 22 are stored in this portion for storing filter coefficients 30.

Next, the portion for computing filter coefficients 44 in the portion for eliminating speaker sound 40 reads the filter coefficient W1 stored in the portion for storing filter coefficients 30 and the transmittal characteristics of CS1, CS2, $Z^{-m}$ and calculates the filter coefficient W2 to be set in the filter 42 based on these figures (step 204).

Now, the relation between the output signal X of the audio device 100 and the signal Y3 which is produced from the portion for eliminating surrounding noise 20 and is input into the computing part 46 in the portion for eliminating speaker sound 40 can be expressed in a frequency range:

$$Y3 = (CS1 \cdot Z^{-m} - CS2 \cdot W1)X \quad (1)$$

Also, the relation between the output signal X of the audio device 100 and the signal Y4 which is produced from the filter 42 in the portion for eliminating speaker sound 40 and is input into the computing part 46 can be expressed:

$$Y4 = W2 \cdot X \quad (2)$$

Therefore, by setting the filter coefficient W2 of the filter 42 in such a manner that $W2 = CS1 \cdot Z^{-m} - CS2 \cdot W1$ is satisfied, it is possible to make both signal Y3, which is produced from the audio device 100 and is input into the computing part 46 through the portion for eliminating surrounding noise 20, and signal Y4, which is produced from the audio device 100 and is input into the computing part 46 directly through the filter 42 and not via the speaker 102, identical, wherein audio sound components can be removed from the output signal Y5 of the computing part 46. Because the update processing of the filter coefficient W1 is stopped when the talk switch 50 is pushed down, the filter coefficient W1 and transmittal characteristics CS1, CS2, $Z^{-m}$ are known values and the filter coefficient W2 of the filter 42 is easily obtained by calculation.

The above-mentioned operation is performed for a certain time (e.g. a few seconds) after the talk switch 50 is pushed down. The LMS algorithm processing part 26 includes a portion for determining whether the talk switch 50 is pushed down or not (step 200) and returns to step 201 after a certain time elapses (step 205) to repeat the calculation of the filter coefficient W1 and an operation after the update processing.

In this way, in the voice input apparatus 1 of the present embodiment, when a user voices an operating instruction toward the microphones 10, 12 after the talk switch 50 is pushed down, surrounding noise components included in an output signal of the microphones 10, 12 are removed by means of the portion for eliminating surrounding noise 20 at the former stage, and audio sound components produced from the audio device 100 are reduced by means of the portion for eliminating speaker sound 40 at the rear stage, wherein a voice signal which includes only an operating voice is input into the voice recognition apparatus 90. Therefore, even when the surrounding noise components and the audio sound components are included in sound collected by the microphones 10, 12, the recognition rate of voice recognition processing in the voice recognition apparatus 90 can be increased because only the operating voice is sent to the voice recognition apparatus 90. Also, when a user voices an operating instruction, an input of the operating voice by a user can be made in such a state that the audio sound produced from the speaker 102 is not interrupted and its volume is not reduced, which can remove discomfort to a user when the audio sound is interrupted.

Especially, because an update of the filter coefficient W1 in the adaptive filter 24 is performed just before the talk switch 50 is pushed down, the elimination of surrounding noise in consideration of actual conditions can be performed.

Moreover, it is not intended to limit the present invention to the above-mentioned embodiment, but alterations of this embodiment can be made within the scope of the present invention. For example, in the above-mentioned embodiment, an explanation was provided for the case wherein a user voices an operating instruction to a navigation system, but the present invention can also be used for the case wherein a user voices an operating instruction to a vehicle-mounted apparatus (e.g. an audio device) other than a navigation system. When a mobile telephone, for example, is used inside a vehicle (except when a voice targeted for a voice recognition is input), the removal of surrounding noise or an audio sound included in a conversation are possible. Still furthermore, other than when used inside a vehicle, the invention may be used in such a manner that surrounding noise components and speaker output sound components (not limited to an audio sound, but voice broadcast on television, or the like may be allowed) included in a voice which is input into a voice recognition apparatus installed indoors and other apparatus are removed.

Furthermore, in the above-mentioned embodiment, two microphones 10, 12 are used, but three or more microphones may be used. Also, a user may provide a circuit to detect a head portion of an operating instruction so that this detected signal may be sent to the LMS algorithm processing part 26 or the portion for calculating filter coefficients 44, though the operating instruction is voiced after the talk switch 50 is pushed down.

According to the present invention as described above, the voice of a user can be extracted, wherein it is not necessary to perform an operation, such as lowering a speaker volume or the like, because surrounding noise components included in a voice signal produced from a sound collecting means are removed by means of an adaptive filter and output sound components of a speaker are also removed from the voice signal after removal of this surrounding noise.

What is claimed is:

1. A voice input apparatus, comprising:
  a sound collecting means having first and second microphones;
  a means for eliminating surrounding noise having an adaptive filter to simulate a first noise signal produced from said first microphone by means of a second noise signal produced from said second microphone and having a first computing means to compute a difference between the first and second noise signals; and a means for eliminating speaker sound eliminating the output component of a speaker from a voice signal after said surrounding noise is removed by said means for eliminating surrounding noise, said speaker receiving an audio signal from an audio device;

wherein said adaptive filter is a digital filter and performs an adaptive equalization processing for a voice signal produced from said second microphone, and a filter processing means updates the filter coefficient of said adaptive filter so that the voice signal produced from said second microphone and a difference signal produced from said first computing means are input to, and the power of said difference signal is minimized by, a LMS algorithm, said means for eliminating surrounding noise further comprising a portion for storing filter coefficients to separately store values for a filter coefficient of said adaptive filter, a transmittal characteristic from said speaker to said first microphone and a transmittal characteristic from said speaker to said second microphone; and wherein said means for eliminating speaker sound comprises a digital filter, the filter coefficient of which is calculated using the data stored in said portion for storing filter coefficients, and an input to which is said audio signal.

2. The voice input apparatus according to claim 1, characterized in that said first and second microphones are both installed in a sunvisor of a vehicle.

3. A voice input apparatus, comprising:

a means for eliminating surrounding noise to remove surrounding noise components included in a voice signal produced from a sound collecting means by use of an adaptive filter, wherein said sound collecting means comprises first and second microphones and said means for eliminating surrounding noise further comprises a portion for storing filter coefficients to separately store values for a filter coefficient of said adaptive filter, a transmittal characteristic from a speaker to said first microphone and a transmittal characteristic from said speaker to said second microphone; and a means for eliminating speaker sound having a filter simulating a transmittal-line characteristic via said speaker and said means for eliminating surrounding noise, comprising a computing means to compute a difference between a signal via said means for eliminating surrounding noise and a signal via said filter and a portion for calculating filter coefficients to obtain a filter coefficient of said filter reflecting a transmittal characteristic shown until an audio sound produced from said speaker based on the filter coefficient of said adaptive filter reaches said computing means through said means for eliminating surrounding noise, wherein said portion for calculating filter coefficients calculates the filter coefficient of said filter based on the filter coefficient of said adaptive filter, the transmittal characteristic from said speaker to said first microphone, and the transmittal characteristic from said speaker to said second microphone, and an input to said filter is an audio signal supplied to said speaker.

4. The voice input apparatus according to claim 3, characterized in that said filter is a digital filter and performs a processing for an audio signal produced from an audio device.

5. The voice input apparatus according to claim 3, characterized in that said computing means calculates a difference signal representing the difference between an output signal of said means for eliminating surrounding noise and an output signal of said filter.

6. A voice input apparatus, comprising:

a means for eliminating surrounding noise to remove surrounding noise components included in a voice signal produced from a sound collecting means by use of an adaptive filter, wherein said sound collecting means comprises first and second microphones and said means for eliminating surrounding noise further comprises a portion for storing filter coefficients to separately store values for a filter coefficient of said adaptive filter, a transmittal characteristic from a speaker to said first microphone and a transmittal characteristic from said speaker to said second microphone;

a means for eliminating speaker sound to remove speaker output components from the voice signal after said surrounding noise is removed by said means for eliminating surrounding noise by use of a filter; and an indicating means for indicating the time of a voice input for said sound collecting means;

wherein said means for eliminating surrounding noise is provided with a filter processing means to perform an update processing of the filter coefficient of said adaptive filter and to stop the update operation when the timing of a voice input is indicated by said indicating means; and wherein said means for eliminating speaker sound is provided with a means for calculating filter coefficients to calculate a filter coefficient of said filter based on the filter coefficient of said adaptive filter and said transmittal characteristics from said speaker to said sound collecting means when said update operation is stopped when the timing of a voice input is indicated by said indicating means, and an input to said filter is an audio signal supplied to said speaker.

7. The voice input apparatus according to claim 6, characterized in that said indicating means indicates the timing of a voice input by a switching operation.

8. The voice input apparatus according to claim 6, characterized in that said indicating means indicates the timing of a voice input by detecting a head part of the voice.

9. The voice input apparatus according to claim 6, characterized in that when a certain time elapses after the timing of a voice input by said indicating means is indicated, an update operation of the filter coefficient of said adaptive filter is restarted.

10. A voice input apparatus, comprising:

a means for eliminating surrounding noise to remove surrounding noise components included in a voice signal produced from a sound collecting means by use of an adaptive filter, wherein said sound collecting means comprises first and second microphones and said means for eliminating surrounding noise further comprises a portion for storing filter coefficients to separately store values for a filter coefficient of said adaptive filter, a transmittal characteristic from a speaker to said first microphone and a transmittal characteristic from said speaker to said second microphone; and a means for eliminating speaker sound to remove speaker output components from the voice signal after said surrounding noise is removed by said means for eliminating surrounding noise by use of a filter, comprising a portion for calculating filter coefficients to obtain a filter coefficient of said filter reflecting a transmittal characteristic shown until an audio sound produced from said speaker based on the filter coefficient of said adaptive filter reaches said computing means through said means for eliminating surrounding noise wherein said portion for calculating filter coefficients calculates the filter coefficient of said filter based on the filter coefficient of said adaptive filter, a transmittal characteristic from said speaker to said first microphone, and a transmittal characteristic from said speaker to said second microphone, and an input to said filter is an audio signal supplied to said speaker.

* * * * *